June 2, 1953   J. H. RAND, JR   2,640,647
MAGNETIZABLE RECORD ELEMENT
Filed Jan. 13, 1950   2 Sheets-Sheet 1
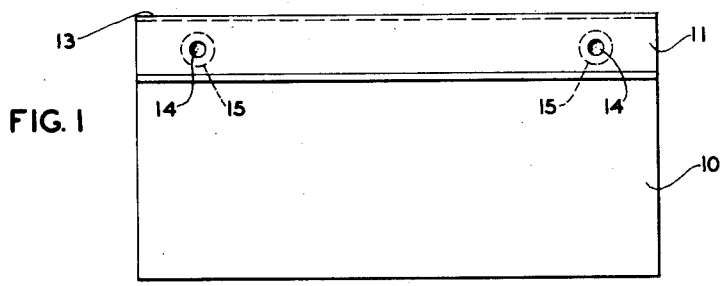
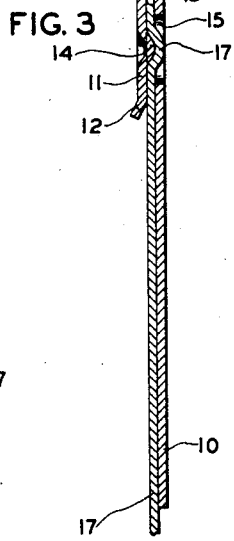
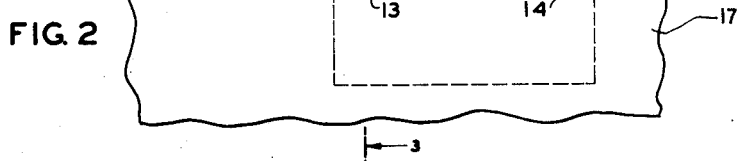
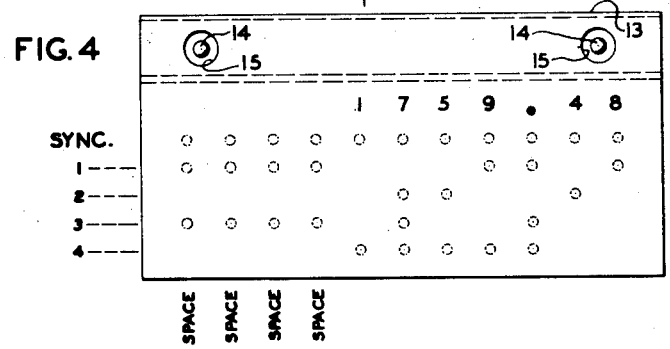
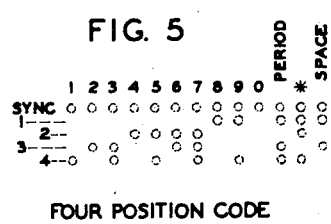
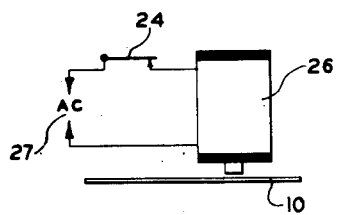
FIG. 7
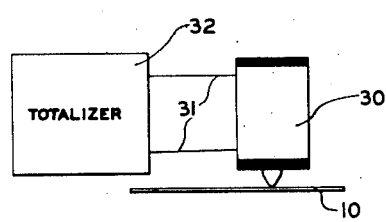
FIG. 8
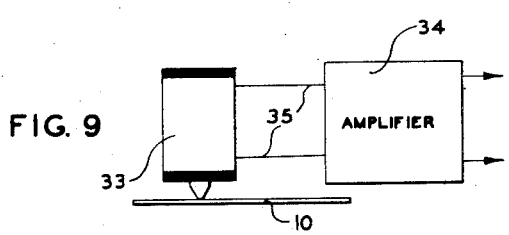
FIG. 9
*INVENTOR.*
JAMES H. RAND JR.
BY *John Tyrol*
*ATTORNEY*

June 2, 1953   J. H. RAND, JR   2,640,647
MAGNETIZABLE RECORD ELEMENT
Filed Jan. 13, 1950   2 Sheets-Sheet 2

INVENTOR.
JAMES H. RAND JR.

BY

ATTORNEY

Patented June 2, 1953

2,640,647

UNITED STATES PATENT OFFICE 2,640,647

MAGNETIZABLE RECORD ELEMENT

James H. Rand, Jr., Darien, Conn., assignor to Remington Rand Inc., New York, N. Y., a corporation of Delaware Application January 13, 1950, Serial No. 138,283

9 Claims. (Cl. 235—61.12)

This invention relates to a magnetizable record element for business machines and the like and more particularly to a metal tag adapted to be variably magnetized with business machine data according to a code to store information for subsequent use.

In the bookkeeping field it has been a problem to carry an accurate balance in an account between different postings so that successive balances will be automatically handled and not be left to the memory of the operator. For instance, in ledger sheet use where a great many sheets representing different accounts are handled each day, the operator of the accounting machine quite frequently forgets to enter the previous or old balance into the machine before making entries on a particular sheet or she may make an error in copying the balance from the sheet when entering it into the machine, both errors resulting in an improper balance after new entries are made. In order to overcome these objections and to enable the carrying of balances in such a manner that the operator will be relieved of the necessity of making the entry of the old balance into the machine manually when handling each ledger sheet, I propose to use a plate which can be carried by its associated ledger sheet, and which can be detached for use in the machine to automatically enter into the machine an old or previous balance and which can be magnetized to carry a new balance when the new entries on the associated ledger sheet have been added.

An object of the invention, therefore is to provide a thin tag or plate of a suitable magnetizable metal for picking up and storing magnetically a balance from a bookkeeping machine, the tag to be used subsequently to control the bookkeeping machine to print or otherwise receive into a register thereof the balance magnetically recorded on the tag or plate.

Another object of the invention is to provide in a magnetic record tag, of the character referred to, a clip by which the plate may be detachably secured, as an accessory, to an associated record card to prevent accidental separation of the plate and the card.

A further object of the invention is to provide a plate of magnetic material for use with a bookkeeping machine upon which a balance can be magnetically recorded in code for subsequent use in automatically controlling the bookkeeping machine to record or otherwise enter the old balance without error.

Other objects and structural details will be apparent from the following description when read in connection with the accompanying drawings wherein:

Fig. 1 is a front view of a magnetic metal tag according to a preferred embodiment of the invention;

Fig. 2 shows the tag drawn to a smaller scale clipped to a ledger card;

Figure 6:
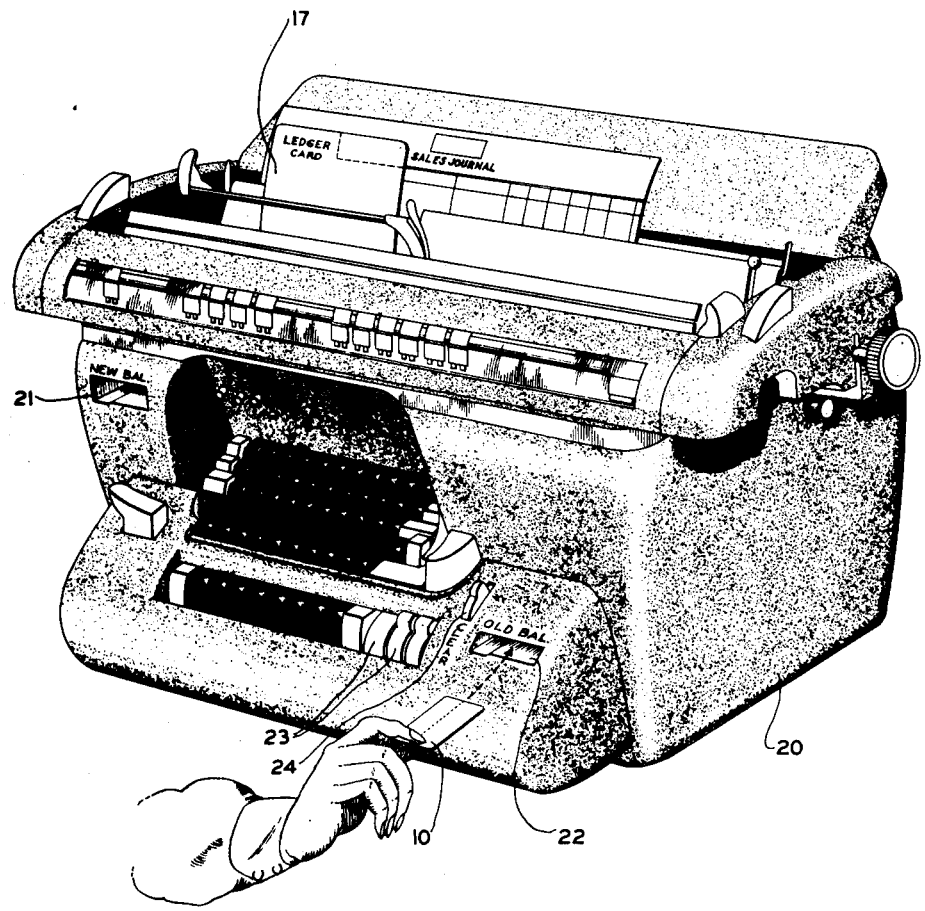
Figure 10:
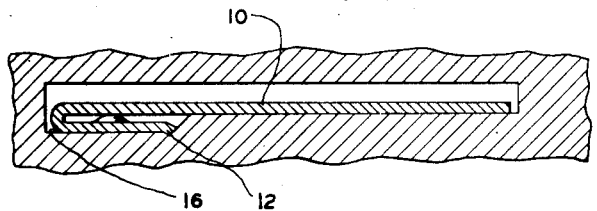

Fig. 3 in an enlarged section taken on the line 3—3 of Fig. 2;

Fig. 4 is a rear view of the tag with a schematic showing of magnetized areas representing characters according to a code illustrated thereon by dotted index position circles;

Fig. 5 shows one form of a four position record code;

Fig. 6 shows a bookkeeping machine with which the record or balance plate is used;

Fig. 7 shows schematically a demagnetizing circuit for use with the plate;

Fig. 8 shows schematically a circuit for recording data on a magnetic tag;

Fig. 9 shows schematically a circuit controlled by the magnetic data on the tag or plate for operating an amplifier of the bookkeeping machine; and, Figure 10 shows a cross-section of a portion of Figure 6 containing the old-balance slot with the magnetic metal tag inserted.

Referring to Figs. 1, 3 and 4, the magnetic record tag according to a preferred embodiment of the invention comprises a rectangular sheet or plate 10 of thin metal with one of the longer sides bent over upon itself to form a narrow elongated flexible clip or clamp strip 11. The free edge 12 of the clamp strip 11 is bent outwardly to slightly space the lower edge thereof from the surface of the tag to facilitate the insertion of an edge portion of a ledger card or other record under the clamp portion. The latter stiffens the tag against bending or distortion during handling. The edge 12 of the clamp strip cooperates with the turned over edge 13 of the tag to engage the sides of suitable guideways 16 which hold the plate accurately positioned with respect to recording and pick-off apparatus in the machine, thereby eliminating mechanical strain on the body of the plate used for magnetic recording. The edge 12 also facilitates detachment of the plate from the ledger sheet by providing a projecting edge engageable by the finger nail to force the plate off the sheet.

The clamp strip may be provided with a plurality of inwardly pressed longitudinally spaced dimples or bosses 14 which are in register with and project slightly within holes 15 punched in the body of the plate 10 to increase the gripping action of the clamp when the plate is attached to a sheet of record material such as the record card 17 shown in Figs. 2 and 3 to prevent accidental separation of the plate and record when filed.

A bookkeeping machine 20 provided with a new balance slot 21, and an old balance slot 22 is shown in Fig. 6. The machine is further provided with a start button 23, an erase button 24, and suitable means for recording data magnetically and reading off or sensing as well as erasing such data from a suitable magnetizable record medium such as the plate 10 of the present invention. Bookkeeping machines and magnetic recording and sensing apparatus are well known in the art as exemplified in the Patents 2,254,931 and 2,412,537 and since specific features of such devices form no part of the present invention, a detailed description thereof is not thought necessary.

An erasing circuit shown schematically in Fig. 7 comprises an electro-magnet 26, or a plurality of such magnets, serially connected by circuits, including switch button 24, to a suitable source 27 of high frequency alternating current. Any suitable arrangement may be used as long as the record area of the plate 10 is exposed momentarily to the alternating current field.

A recording circuit is shown schematically in Fig. 8 which comprises a plurality of magnets 30, one of which is shown disposed with their pole pieces positioned adjacent to the plate 10. The magnet 30 is shown to be controlled by circuits 31 which in turn are controlled by the output of totalizer 32.

A sensing circuit is shown schematically in Fig. 9 for reading off data magnetically recorded on plate 10. This circuit comprises electro-magnets 33, one of which is shown in Fig. 9 disposed adjacent plate 10. The magnet is shown as controlling the input of amplifier 34 through circuits 35.

As already explained, the plate or tag 10 is used to store magnetically, information such as an old or new balance. For example, assume a six-digit balance has been magnetically recorded on the plate by a bookkeeping machine such as the one shown in Fig. 6. For this purpose, a four position code, such as that shown in Fig. 5, may be used. If the six-digit balance is $1,759.48 the tag will be magnetized at spaced points as shown in Fig. 4. It will be understood that the digits printed over the code characters in Fig. 4 are for the purpose of this description only and that nothing ordinarily will be printed by the bookkeeping machine on tag 10. The surface of the plate could be treated, if desired, so that identifying markings could be made thereon.

Assume that the tag bearing such old balance has been unclipped from the ledger card 17 and placed in the guideway 16, in the old balance slot 22 of bookkeeping machine 20. As previously stated, the clamp 11 fits into the guideway and prevents the tag from being properly seated if inserted upside down or wrong end foremost. Upon depression of the start button 23 the coded information on the tag will be sensed and the old or last balance will be automatically set up in the proper register of the machine and, if desired, printed on the ledger card in the proper balance column. After the bookkeeping machine has sensed, entered and/or printed the old balance, the operator then manipulates the erase button 24 thus removing the old balance from the tag. The tag is then removed from the old balance slot 22 and inserted into the new balance slot 21. When the bookkeeping machine has computed the new balance of the current transaction, such new balance will then be recorded in code on the plate 10 which is then removed from slot 21. The ledger card 17 bearing details of the transaction is removed from the machine and the plate 10 is detachably clamped thereto for future use.

While I have described what I consider to be a highly desirable embodiment of my invention, it is obvious that changes in form could be made without departing from the spirit of the invention, and I, therefore do not limit myself to the exact form herein shown and described, nor to anything less than the whole of my invention as herein set forth and as hereinafter claimed.

What I claim is:

1. A ledger sheet and balance storage plate combination for use with a bookkeeping machine having a guide receptacle for the storage plate, which machine includes means for magnetically recording on and reading from said storage plate a balance related to said ledger sheet, the storage plate being made of magnetizable material and being shaped to provide a clip portion constituting clamping means for detachably securing said sheet and plate together and coacting with said guide receptacle for properly positioning the plate relatively thereto.

2. A control record for recording apparatus of a business machine having a record receptacle including guide means comprising a rectangular sheet of magnetic metal having a portion along one edge turned over to form a clip for cooperation with said guide means for properly positioning the sheet in the recording apparatus.

3. A control record for business machines and the like comprising an oblong sheet of magnetic metal having a relatively narrow portion along one edge folded over to form a clip for attaching the metal sheet to an identifying member and a plurality of projections on the under surface of the clip for improving its gripping action.

4. A magnetizable record element for business machines and the like comprising an oblong sheet of magnetic material having a plurality of holes formed therein in alignment with and spaced from one edge, a clip member formed of a relatively narrow edge portion of the sheet folded over the holes and a plurality of bosses formed in the turned over portion respectively in register with and projecting partly into the holes.

5. A record accessory member for controlling a statistical machine and adapted to be positioned in a guide receptacle in said machine, comprising a thin metallic plate adapted to retain invisible information magnetically recorded therein at spaced points in accordance with a predetermined code index and means for detachably securing the accessory member to a record on which related information is visibly marked, said securing means coacting with said guide receptacle to permit only proper insertion of the plate into the guide receptacle.

6. A record receiving element for use in combination with a bookkeeping machine of the character described, the bookkeeping machine including a balance slot adapted to receive the record receiving element, the slot having an enlarged portion at one end, the record receiving element comprising a magnetizable thin metal sheet having a turned over portion at one end forming a clamp, and the free edge of the clamp portion being raised slightly upward and away from the face of the sheet portion, said clamp serving as means of attaching an identifying ledger card to the record element when the record element is out of the machine, said turned over portion and raised edge being receivable in the enlarged portion of the slot, the walls of the enlarged portion of the slot being complementary to the turned over clamp portion and raised edge of the record element whereby the record element is enabled to be accurately positioned in the slot for receiving a code record.

7. For use in combination with a ledger card and a bookkeeping machine, a record receiving element, the bookkeeping machine including a balance slot into the machine and means for recording data magnetically on the magnetizable element or for sensing or erasing such data from the element, the record receiving element comprising a third oblong sheet of magnetizable metal material having a portion at one end turned over upon itself forming a clamp, the clamp portion being adapted to receive therein the ledger identifying card when the record receiving element is out of the machine and said clamp portion serving to stiffen the sheet portion of the record element against distortion during handling, the clamp portion having a series of holes and complementary bosses in register with the holes serving to further secure the ledger card within the clamp, and the turned over end forming said clamp having its free edge turned slightly upward and away from the face of the sheet portion of the recording element, the balance slot into the machine having a portion thereof enlarged, the sides of the enlarged slot portion being complementary to the clamp portion and the turned up edge of the record receiving element whereby the record receiving element is enabled to be accurately positioned in the slot for action thereon by the recording, sensing, or erasing means of the bookkeeping machine.

8. A magnetizable member for use in combination with a bookkeeping machine having a guideway opening, the magnetizable member comprising a thin metal sheet portion and a clamp section integral therewith, the clamp section being one end of the thin sheet portion turned over upon itself, the clamp section serving to stiffen the thin sheet portion against distortion in handling, the clamp portion having a free edge thereof turned slightly upward and away from the face of the sheet portion, the guideway opening of the bookkeeping machine having sides adapted to engage the clamp portion and the turned up edge of the clamp whereby the magnetizable element may be accurately positioned in the guideway, said clamp when out of the machine serving to receive therein a ledger identifying card, and said clamp having a series of holes with bosses in resilient register with the holes whereby the ledger card may be more securely contained within the clamp.

9. A control record for the recording apparatus of a business machine having a record supporting surface including guide means; comprising a sheet of magnetizable material shaped to fit said surface and securing means on said sheet coacting with said guide means for correctly positioning the sheet on said record supporting surface.

JAMES H. RAND, JR.

References Cited in the file of this patent

UNITED STATES PATENTS

| Number | Name | Date |
|---|---|---|
| 1,584,995 | Saltzman | May 18, 1926 |
| 2,002,807 | Whitson | May 28, 1935 |
| 2,110,854 | Fuller et al. | Mar. 15, 1938 |
| 2,357,455 | Bryce | Sept. 5, 1944 |

FOREIGN PATENTS

| Number | Country | Date |
|---|---|---|
| 540,600 | Great Britain | Oct. 23, 1941 |